United States Patent [19]

Snyder

[11] Patent Number: 5,237,454

[45] Date of Patent: Aug. 17, 1993

[54] BLACKHOLE LASER BEAM TERMINATOR

[75] Inventor: James J. Snyder, San Jose, Calif.

[73] Assignee: Blue Sky Research, Inc., San Jose, Calif.

[21] Appl. No.: 643,164

[22] Filed: Jan. 18, 1991

Related U.S. Application Data

[63] Continuation of Ser. No. 404,313, Sep. 7, 1989, abandoned.

[51] Int. Cl.$^5$ ............................................. G02B 27/00
[52] U.S. Cl. .................................... 359/602; 359/839; 359/861; 359/884
[58] Field of Search ............... 350/311, 316, 600, 601, 350/602, 618, 622, 642, 276 R, 277, 278; 374/32; 359/839, 857, 861, 884, 601, 602

[56] References Cited

U.S. PATENT DOCUMENTS

| | | | |
|---|---|---|---|
| 3,699,471 | 10/1972 | Mulready et al. | 350/276 SL |
| 3,792,916 | 2/1974 | Sarna | 350/316 |
| 4,487,478 | 11/1984 | Jackson | 350/622 |
| 4,511,216 | 4/1985 | Hsu et al. | 350/311 |
| 4,682,855 | 7/1987 | Honda et al. | 350/642 |
| 4,746,205 | 5/1988 | Cross et al. | 350/602 |

OTHER PUBLICATIONS

Franzen et al, "Absolute Reference Calorimeter for Measuring High Power Laser Pulses", Dec. 1976, *Applied Optics*, vol. 15, No. 12, pp. 3116–3122.

*Primary Examiner*—Bruce Y. Arnold
*Assistant Examiner*—J. P. Ryan

[57] ABSTRACT

A terminator system particularly suited for beams of high intensity electromagnetic radiation such as from a laser includes an enclosure having a hole therein and a black mirror mounted in the enclosure. The black mirror has a specularly reflecting surface opposite the hole and is oriented at an angle such that the beam impinging on the hole would be impinging on the specularly reflecting surface and would not be reflected directly back out the hole. The black mirror is constructed of a material that absorbs energy at the wavelength of the incident beam. In another preferred embodiment, there are a plurality of black mirrors for performing a succession of reflections, so that the beam power is reduced significantly at each reflection.

8 Claims, 3 Drawing Sheets

BLACKHOLE LASER BEAM TERMINATOR

CROSS REFERENCE TO RELATED APPLICATION

This is a continuation of application Ser. No. 404,313, filed Sep. 7, 1989, now abandoned.

BACKGROUND OF THE INVENTION

This invention relates to laser safety, and in particular to laser beam terminating systems.

One of the safety problems associated with the use of lasers is eye protection. Even a relatively low power laser, say one milliwatt, has such a high energy density that looking directly into the beam can cause permanent retinal damage. Also, even for medium power lasers, say one watt, even the scattered light can be temporarily blinding, and at higher powers can be permanently damaging.

In the typical experimental situation, a laser beam is directed toward some arrangement of other optical elements and after the beam has traversed those elements an appropriate optical terminator is required to eliminate the remaining light. Termination can be particularly important as indicated earlier for higher power systems in order to avoid eye damage, but also, even for low power systems it is often desirable to eliminate the remaining beam so that it does not cause interference effects upstream that could disrupt the experimental setup. At the present time, for low power systems, a simple system such as a card is used as a beam stop, and generally the upstream effects are ignored. For high power systems, more elaborate schemes must be used. For example, one approach is to use a laser power meter as a beam stop. Neither of these approaches is particularly good. For example in the case of the card, scatter can cause effects upstream, and in the high power case using a power meter is indeed an expensive way to proceed.

Clearly what is needed is an inexpensive laser optical terminator that essentially absorbs all or substantially all of the light impinging on it.

SUMMARY OF THE INVENTION

In accordance with preferred embodiments of the invention, a terminator system is provided which is particularly suited for beams of high intensity electromagnetic radiation such as from a laser. The terminator includes an enclosure having a hole therein and a black mirror mounted in the enclosure. The black mirror has a specularly reflecting surface opposite the hole and is oriented at an angle such that the beam impinging on the hole would be impinging on the specularly reflecting surface and would not be reflected directly back out the hole. The black mirror is constructed of a material that absorbs energy at the wavelength of the incident beam.

In a preferred embodiment, the black mirror of the attenuator is constructed of filter glass. Further, in another preferred mode, the black mirror has an antireflection coating thereon.

In another preferred embodiment, the black mirror of the attenuator is constructed of a semiconductor material having a band gap that is less than the energy of the incident beam.

In another preferred embodiment, there are a plurality of black mirrors for performing a succession of reflections, so that the beam power is reduced significantly at each reflection.

In each of the above preferred embodiments, it is preferred that the interior of the surface of the box be substantially non-specular.

BRIEF DESCRIPTION OF THE DRAWINGS

Shown in FIG. 1 is an exploded view of a laser terminator according to preferred embodiments of the invention.

Shown in FIG. 2 is a top cutaway view of the laser terminator of FIG. 1 showing the optical path of an impinging beam.

Figure 3:
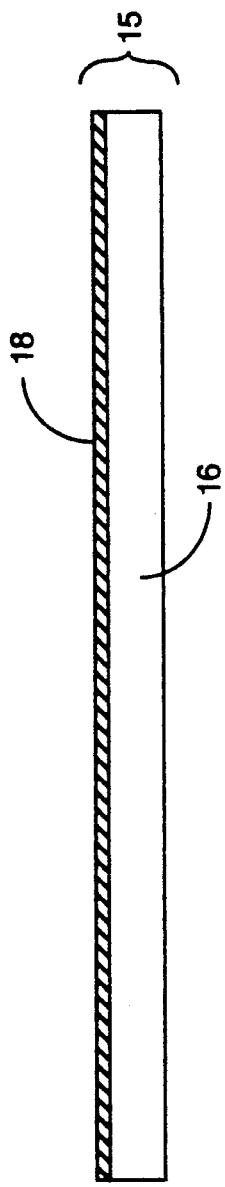

Shown in FIG. 3 is a side view of a black mirror according to a preferred embodiment of the invention.

Figure 4:
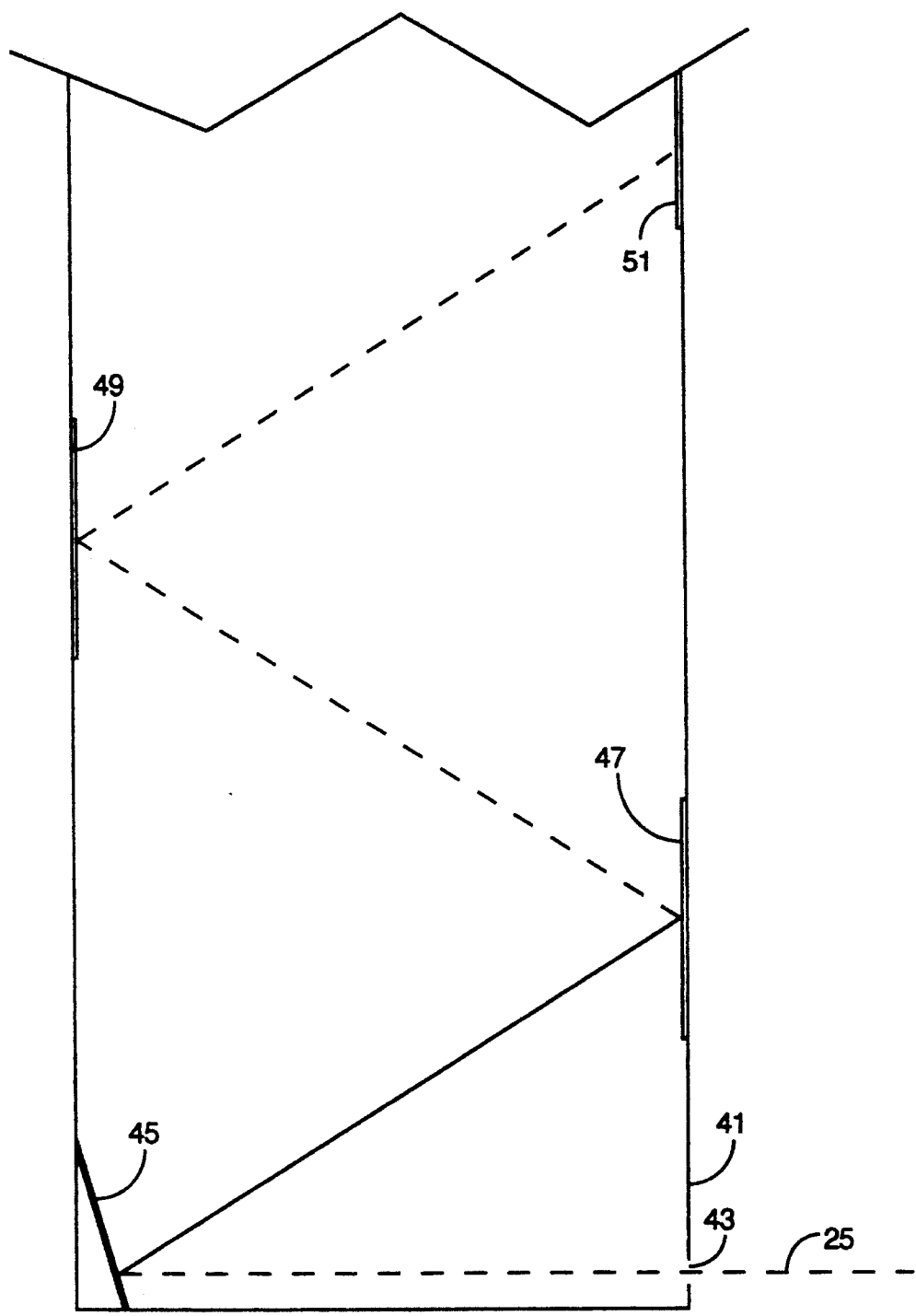

Shown in FIG. 4 is a top view of an alternative preferred embodiment of the invention.

DESCRIPTION OF THE PREFERRED EMBODIMENTS

Figure 1:
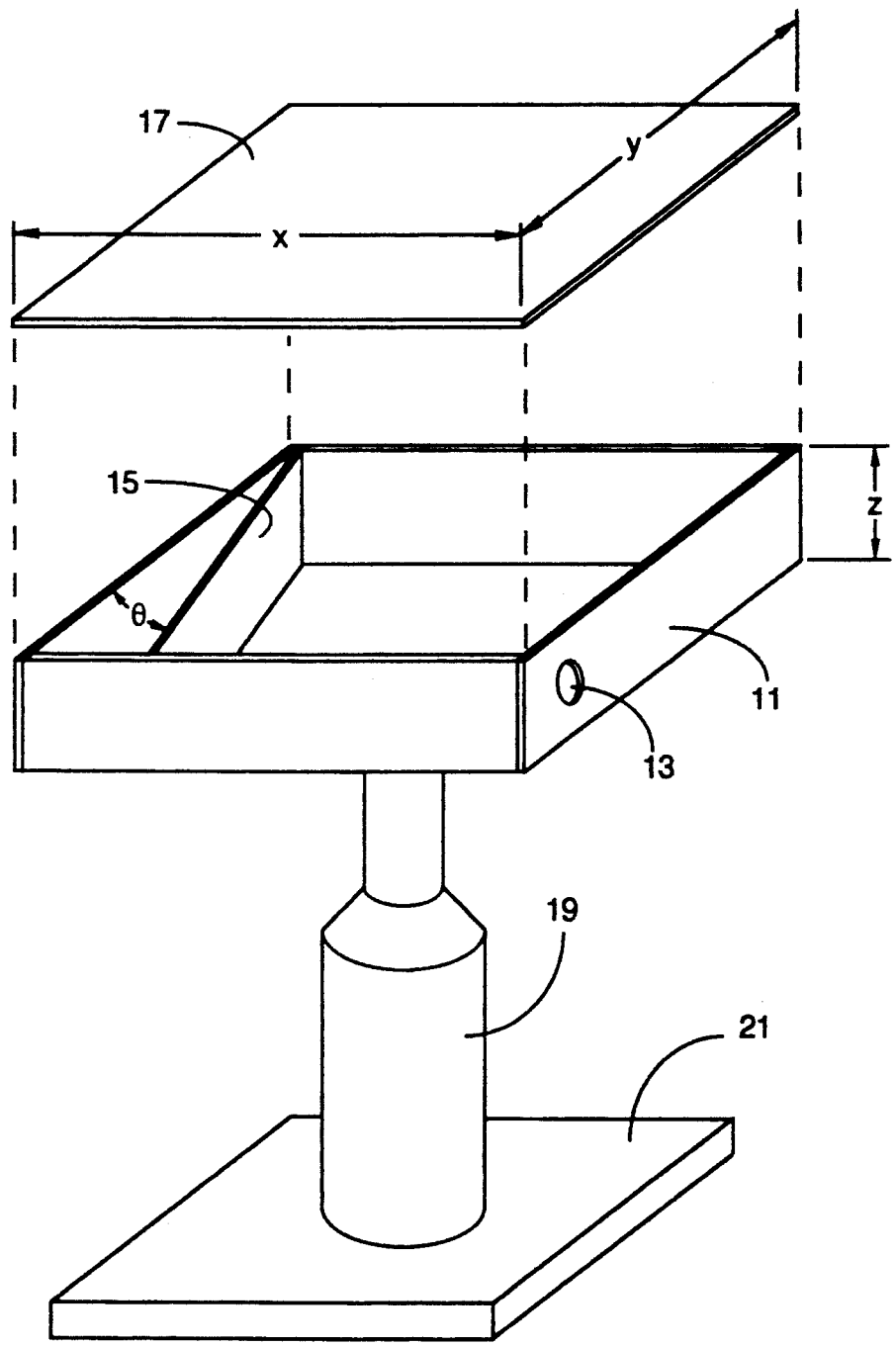

Shown in FIG. 1 is a box 11, typically metal or plastic, having a lid 17 and a hole 13 therein. In the typical case, the box is mounted on an adjustable pedestal 19 which is attached to a base 21 as is customary in the art. Although the dimensions are not generally critical, in the preferred mode, the box has a height $z=1.0$ in., a width $y=3$ in., and a length $x=4$ in. The hole 13 is typically about 0.5 in. in diameter and its center is located about 0.5 in. from the edge and the top and bottom of the box. Also in the preferred mode, the inside of the box is coated with a black, substantially non-reflecting surface, e.g. black anodizing if the box is aluminum, or matte black paint.

Inside the box is fastened a black mirror 15, oriented at an angle $\theta$ relative to the back of the box. In a first preferred embodiment, the black mirror is constructed of a piece of highly polished filter glass, such as IR 850, available from Hoya Optical Glass located in Fremont, Calif. In a second preferred embodiment, black mirror 15 is constructed of a substrate 16, e.g. a highly polished piece of filter glass as before, which has an antireflection coating 18 deposited thereon. (See FIG. 3) Typical optical antireflection coatings can be used such as are readily available commercially. Although the apparatus is very useful without the antireflection coating, best results are obtained when such a coating is used, particularly broadband coatings so that a variety of laser wavelengths can be accomodated.

The filter glass is used since it is highly absorbing for most of the wavelengths of interest. The purpose of having a highly polished surface on the filter glass is to avoid any scattering of the incident light, so that substantially the only light leaving the black mirror is specularly reflected.

Although filter glass has been shown to be satisfactory up to powers as high as two watts, higher powers could potentially damage the substrate material. For such higher power applications at visible and near infrared wavelengths, one could use a polished semiconductor wafer, e.g. silicon or germanium, having a band gap with an energy less than the energy associated with the laser wavelength, so that the wafer would be highly absorbing due to phonon assisted electronic transitions in the material. It is believed that the mechanical and thermal characteristics and absorbing properties of such a semiconductor black mirror would be well suited for absorbing substantially higher optical powers than is possible with filter glass. Other materials with good thermo-mechanical characteristics which are absorbing at mid- and far- infrared wavelengths, e.g. silicon carbide or fused silica, could be used for longer wavelength lasers such as the 10.6 micrometer $CO_2$ laser.

Figure 2:
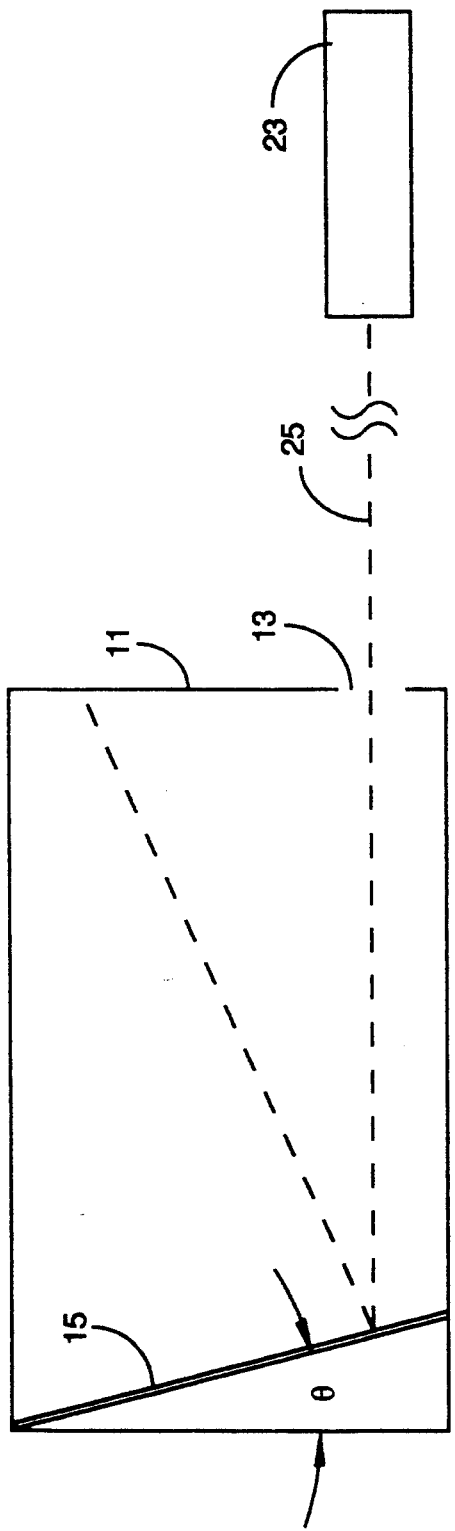

In the preferred mode, the angle $\theta$ is typically about 15°, although other angles could be used as well which will become apparent shortly. In a typical setup as illustrated in FIG. 2, beam 25 incident from laser 23, enters hole 13 of box 11, and impinges on black mirror 15, which absorbs substantially all of the incident beam. For that portion of the beam not absorbed, the black mirror specularly reflects it toward the wall of the box away from the hole 13. In the typical case, it is estimated that the black mirror decreases the power in the specularly reflected beam by at least two to three orders of magnitude below that of the incident beam. Hence, in the typical setup, any reflection or scattering of light incident on the inside wall of the box would result in a negligible amount of light exiting back out through hole 13.

Shown in FIG. 4 is an alternative embodiment of the invention which uses more than one black mirror. As seen in FIG. 4, a box 41 has a hole 43 as in FIG. 1, opposite which is located a black mirror 45. Black mirror 45 is oriented at an angle as before, and an incoming beam 25 is reflected across the box onto a second black mirror 47. Black mirror 47 again reflects the beam, that reflection being received by another black mirror 49, which is received and reflected by black mirror 51, etc., for as many times as is desired to attenuate the beam. Each time the beam strikes a black mirror it is attenuated by at least two to three orders of magnitude. When the beam power is finally reduced to an acceptable level, the last reflection can be dumped onto a non-specular black surface of the box as before.

Those skilled in the art will realize that there are many other embodiments of the invention that are equivalent to those described herein and that fall within the spirit and scope of the invention. For example different sizes and shapes for the box and different orientation angles for the black mirrors can be used. Similarly, other materials can be used instead of filter glass for the black mirror, and different materials may be used to construct the box. Also, although all mirrors shown in FIG. 4 which are downstream from mirror 45 are shown parallel with the walls of the box, they can be oriented otherwise as long as they can reflect the light from one mirror to another to attenuate the beam successively. Similarly, although the mirrors along the walls of the box in FIG. 4 are shown as having only one reflection at each mirror, there could be multiple reflections at each mirror, and in a simple configuration might consist of only two mirrors parallel to the walls which reflect the light back and forth a multitude of times.

What is claimed is:

1. A terminator for an incident beam of electromagnetic energy comprising:
   an enclosure having a hole therein;
   first black mirror means mounted in said enclosure, said first black mirror means having a polished specularly reflecting surface opposite said hole oriented at an angle such that said beam impinging on said hole would be impinging directly on said specularly reflecting surface and would not be reflected directly back out of said hole, said first black mirror means being constructed of a material that absorbs energy at the wavelength of the incident beam, said black mirror means being characterized as black since any energy entering the enclosure that is not specularly reflected is absorbed by the black mirror means and the percentage of energy absorbed is substantially larger than the energy reflected;
   said enclosure, said hole, and said first black mirror means arranged such that substantially no electromagnetic energy entering said hole exits said enclosure, and said enclosure not having any coolant in contact therewith except the ambient atmosphere;
   wherein said first black mirror means comprises filter glass.

2. A terminator as in claim 1 wherein said first black mirror further comprises an antireflection coating on said filter glass.

3. A terminator as in claim 1 wherein the interior of said enclosure has a non-specular coating.

4. A terminator as in claim 3 wherein said coating is a matte finish and absorbing at the wavelength of the incident beam.

5. A terminator for an incident beam of electromagnetic energy comprising:
   an enclosure having a hole therein;
   first black mirror means mounted in said enclosure, said first black mirror means having a polished specularly reflecting surface opposite said hole oriented at an angle such that said beam impinging on said hole would be impinging directly on said specularly reflecting surface and would not be reflected directly back out of said hole, said first black mirror means being constructed of a material that absorbs energy at the wavelength of the incident beam, said black mirror means being characterized as black since any energy entering the enclosure that is not specularly reflected is absorbed by the black mirror means and the percentage of energy absorbed is substantially larger than the energy reflected;
   said enclosure, said hole, and said first black mirror means arranged such that substantially no electromagnetic energy entering said hole exits said enclosure, and said enclosure not having any coolant in contact therewith except the ambient atmosphere;
   wherein said first black mirror means comprises a semiconductor having a band gap that is less than the energy of the incident beam.

6. A terminator as in claim 5 wherein said first black mirror means has an antireflection coating.

7. A terminator for an incident beam of electromagnetic energy comprising:
   an enclosure having a hole therein:
   first black mirror means mounted in said enclosure, said first black mirror means having a polished specularly reflecting surface opposite said hole oriented at an angle such that said beam impinging on said hole would be impinging directly on said specularly reflecting surface and would not be reflected directly back out of said hole, said first black mirror means being constructed of a material that absorbs energy at the wavelength of the incident beam, said black mirror means being characterized as black since any energy entering the enclosure that is not specularly reflected is absorbed by the black mirror means and the percentage of energy absorbed is substantially larger than the energy reflected; and
   second black mirror means in said enclosure arranged for receiving electromagnetic energy reflected from said first black mirror means that is incident through said hole;

said enclosure, said hole, said first black mirror means, and said second black mirror means arranged such that substantially no electromagnetic energy entering said hole exits said enclosure, and said enclosure not having any coolant in contact therewith except the ambient atmosphere.

8. A terminator for an incident beam of electromagnetic energy comprising:

an enclosure having a hole therein;

first black mirror means mounted in said enclosure, said first black mirror means having a polished specularly reflecting surface opposite said hole oriented at an angle such that said beam impinging on said hole would be impinging directly on said specularly reflecting surface and would not be reflected directly back out of said hole, said first black mirror means being constructed of a material that absorbs energy at the wavelength of the incident beam, said black mirror means being characterized as black since any energy entering the enclosure that is not specularly reflected is absorbed by the black mirror means and the percentage of energy absorbed is substantially larger than the energy reflected; and a plurality of additional black mirror means in said enclosure, said plurality of additional black mirror means arranged to successively receive electromagnetic energy reflected from said first black mirror means that is incident through said hole;

said enclosure, said hole, said first black mirror means, and said plurality of additional black mirror means arranged such that substantially no electromagnetic energy entering said hole exits said enclosure, and said enclosure not having any coolant in contact therewith except the ambient atmosphere.

* * * * *